Figure 1:
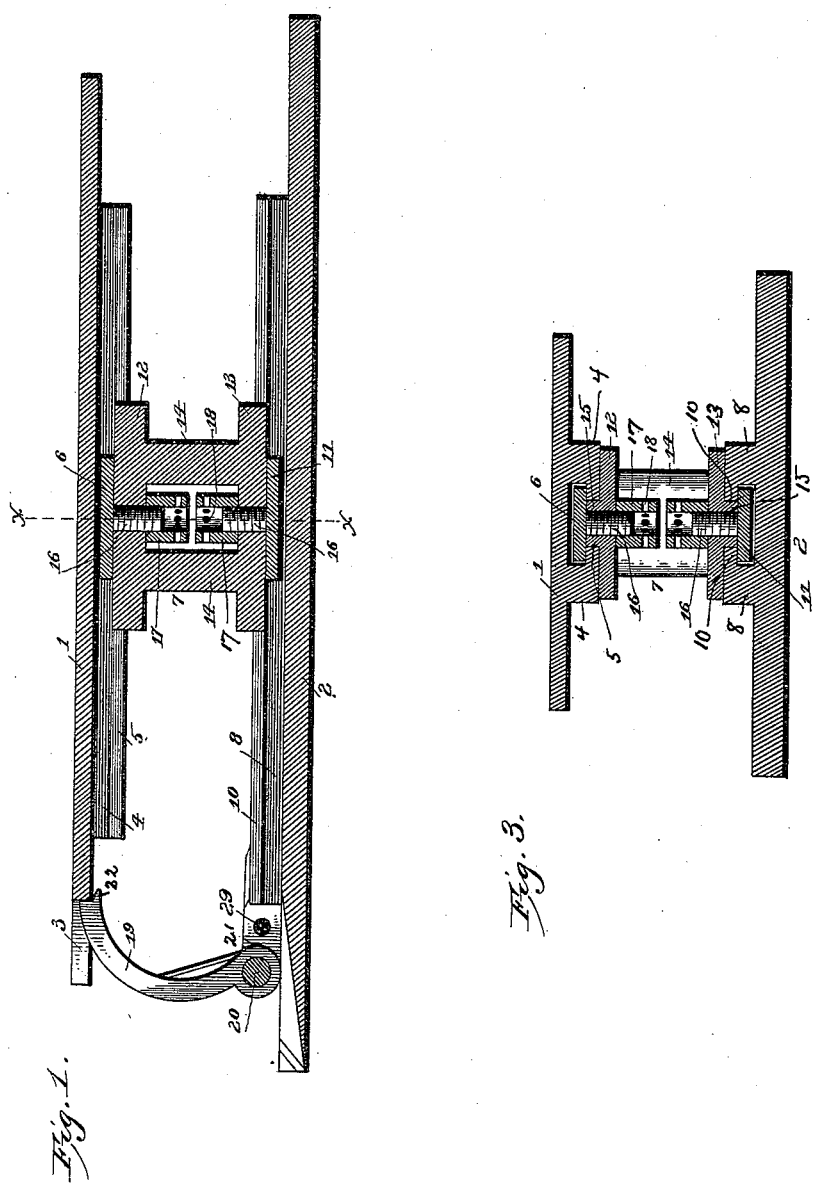

(No Model.) 2 Sheets—Sheet 2.
J. J. DALEY.
IRONING MACHINE.
No. 419,504. Patented Jan. 14, 1890.
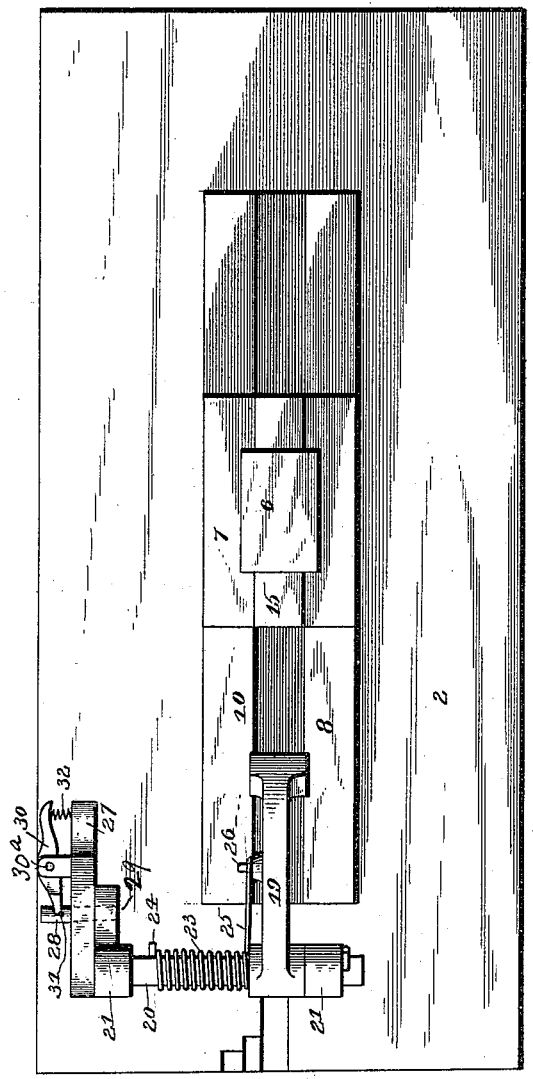
Fig. 2
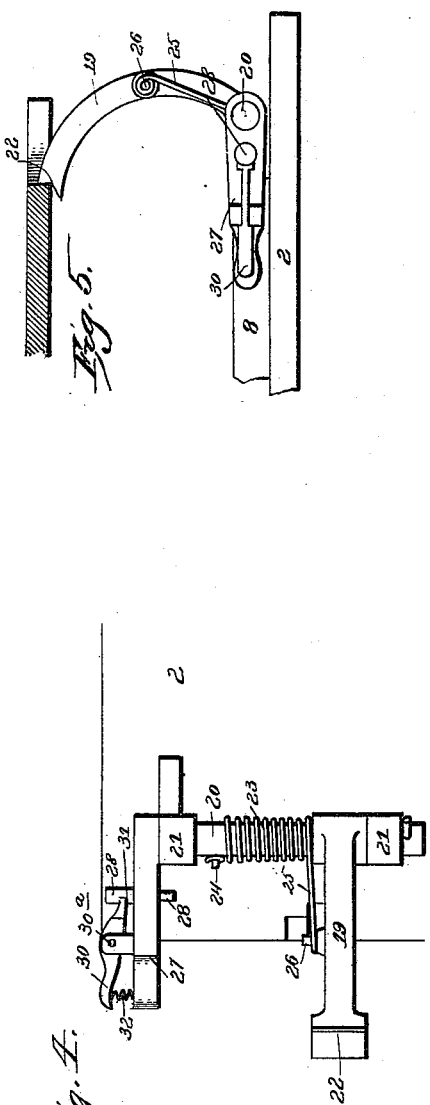
Fig. 5
Fig. 4
WITNESSES:
INVENTOR:
John J. Daley

UNITED STATES PATENT OFFICE.

JOHN J. DALEY, OF BROOKLYN, NEW YORK.

IRONING-MACHINE.

SPECIFICATION forming part of Letters Patent No. 419,504, dated January 14, 1890.

Application filed October 29, 1889. Serial No. 328,514. (No model.)

*To all whom it may concern:*

Be it known that I, JOHN J. DALEY, a citizen of the United States, and a resident of Brooklyn, in the county of Kings and State of New York, have invented certain new and useful Improvements in Ironing-Machines; and I do hereby declare that the following is a full, clear, and exact description of the invention, which will enable others skilled in the art to which it appertains to make and use the same.

My invention relates to improvements in ironing-machines, and is designed more particularly for ironing shirts, although provision is made for removing the ironing-table and replacing it with one suitable for ironing collars, cuffs, and other like articles.

It consists in certain novel features of construction and combination of parts, which will be hereinafter fully described, and definitely pointed out in the appended claims.

In the accompanying drawings, Figure 1 is a longitudinal sectional view of the ironing-table and carriage of an ironing-machine, showing the movable support intermediate thereof and the goose-neck or arm for confining the neckband to the table. Fig. 2 is a plan view of the same, the ironing-table being removed. Fig. 3 is a section on the line $x\ x$, Fig. 1. Fig. 4 is a plan view of the neckband-clamping device thrown back out of contact with the ironing-table. Fig. 5 is a side view of the same.

I have not illustrated the operative parts of the machine by which the traveling carriage is made to reciprocate back and forth beneath the ironing-roll, as these may be of any ordinary or suitable construction, and the invention relates entirely to the movable support and means for clamping the neckband.

In the said drawings, the reference-numeral 1 designates the ironing-table, and 2 the carriage or carrying-table. The front end of the ironing-table is recessed or cut away, as seen at 3, so as to correspond with and receive the neckband of the shirt. Upon the under side this table is provided with guide-bars 4, having inwardly-turned flanges 5, forming a guideway for the pivoted cross-head 6 of the support 7. Similar guide-bars 8 are formed upon the upper side of the carrying-table 2, said guide-bars being provided with flanges 10, forming a guideway for the lower cross-head 11 of support 7. This support 7 consists of two plates 12 and 13, rigidly connected together by the uprights 14, and each plate has a central horizontal rib or feather 15, which fits and slides between the flanges 5 5 and 10 10 of the guide-bars 4 and 8. Each of the plates 12 and 13 is provided with a central aperture, through which pass the screws 16, the outer ends of which are securely attached to the cross-heads 6 and 11. The inner ends of these screws are provided with nuts 17, having perforations 18 for the insertion of a bar or lever for turning the same. From the above it will be seen that when the screws 16 are loose the cross-heads will be held loosely in the guideways formed by the guide-bars 4 and 8, and the support may be freely reciprocated back and forth in said guideways; but when the screws are tightened by means of the nuts the cross-heads will clamp the guide-bars tightly between them and the plates 12 and 13, thus preventing the supports from moving and holding the ironing-table and carrying-table in fixed relative position to each other.

In ironing open-front shirts it is very desirable and necessary to provide some means by which the shirt can be clamped at both sides of the neckband to the ironing-table, so as to hold the bosom firmly and prevent wrinkling. I have devised the following means for this purpose: The reference-numeral 19 designates a goose-neck or arm secured to a bar or shaft 20, which is journaled in bearings 21, secured to the upper side of the carrying-table, and is capable of freely rotating in said bearings. This goose-neck or arm is in alignment with the horizontal center of the ironing-table, and is so proportioned in relation thereto that when turned over so as to clamp the neckband its grooved end 22 will engage or coincide with the lower edge of said ironing-table at the recessed part thereof. 23 designates a coiled spring embracing the shaft 20, and one end of which engages with a stud or pin 24 on said shaft. The other end of the coiled spring is extended outwardly, forming an arm 25, which engages with a pin 26 on the goose-neck or arm, intermediate of the ends thereof. One end of the shaft 20 is provided with a crank or arm 27, by which it may be rotated. 28 designates a sliding pin passing through the crank or arm 27 and engaging with a perforation 29 in the bearing 21, adjacent to the arm. Connected with pin 28 is a lever 30, fulcrumed at 30ª to the arm 27. One end of the lever fits in a groove 31 in pin 28 so that said pin can be disengaged from the hole or perforation by depressing the other end of said lever. 32 designates a spring intermediate the free end of the lever and the arm 27, whereby said pin is normally forced inward, so as to engage with perforation 29.

I have referred to the carrying-table as being a traveling carriage reciprocated back and forth by the operative parts of the machine beneath the ironing roll or cylinder; but it is obvious that the said table may be stationary and the ironing-roll be made to reciprocate over it without departing from the principle of my invention, as my invention is equally applicable to either of such constructions.

The operation of the machine is as follows: Supposing an open-back shirt is to be ironed, the screws 16 are loosened, thus allowing the support to be moved up toward the front or cut-away end of the ironing-table. The screws are then tightened, so as to firmly hold the ironing and carrying tables and the support in fixed relative position to each other. The shirt is now adjusted on the ironing-table by drawing it over the same, the bosom being on top and the back underneath. It will be seen that the support will pass between the open portions of the back, allowing the neckband to be drawn up to the recessed or cut-away portion of the table and be clamped thereto by the goose-neck or arm. If it is desired to iron an open-front shirt, the support is moved to the opposite end of the table by loosening the screws, as aforesaid, and it is now out of the way of the shirt, which is drawn on the board, neck rearmost, from the cut-away or rear portion of the table. It will be noted that open-back and open-front shirts are put on the ironing-table at opposite ends thereof, respectively, but always with the neckband resting at the recessed or cut-away portion when properly adjusted thereon. When the shirt has been placed upon the ironing-table ready to be subjected to the action of the ironing roll or cylinder, the neckband thereof is clamped and held thereto by the grooved end of the goose-neck or arm 19. This brings the goose-neck or arm into operative contact with the neckband. From the position shown in Fig. 4 the crank-arm 27 is turned upward, rotating the shaft 20, the pin 24 of which, engaging with the coiled spring, causes the arm 25 of the latter to raise the goose-neck or arm into contact with the neckband. One-quarter of a revolution of the shaft 20 will cause the goose-neck or arm to be so raised as to engage with the neckband. The neckband is now properly adjusted between the goose-neck or arm and the ironing-table and the crank-arm further turned or depressed, so that pin 28 engages with the perforation in the bearing 21 and holds the arm in place and prevents the shaft 20 from rotating. It will be noted that this last quarter-revolution of the shaft 20 causes the goose-neck or arm to be firmly pressed against the neckband, securely clamping it in place, as the pin 26 on the goose-neck or arm, with which one end of the coiled spring is connected, now being stationary, it acts as a stop to said spring, which is consequently wound up by the pin 24 engaging with the other end. After the shirt is ironed and it is desired to release the same the free end of lever 30 is depressed, forcing outward the other end thereof, which carries with it a pin 28, whereby it is released from engagement with the perforation in the bearing 21. The goose-neck or arm is then thrown backward out of the way and the shirt can be readily taken off.

The ironing-table can be taken off the support 7 by loosening the screws 16 and sliding the cross-head from between the guideways, and be replaced by one suitable for ironing collars, cuffs, and other similar articles.

Having thus described my invention, I claim and desire to secure by Letters Patent of the United States—

1. In an ironing-machine, the combination, with a carrying-table and a slidable support adjustably mounted thereon, of an ironing-table horizontally slidable and adjustable upon said support, substantially as described.

2. In an ironing-machine, the combination, with an ironing-table having guide-bars on its under face and a carrying-table having similar guide-bars upon its upper face, of a horizontally adjustable and slidable support intermediate of said tables, having cross-heads upon their upper and lower sides fitting and moving between said guide-bars, and means for regulating the frictional contact between said cross-heads and guide-bars, substantially as described.

3. In an ironing-machine, the combination, with an ironing-table and a carrying-table having the guide-bars 4 and 8 and inwardly-turned flanges 5 and 10, of the support 7, having plates 12 and 13, connected by uprights 14, the ribs 15 on plates 12 and 13, the screws 16, nuts 17, and cross-heads 6 and 11, substantially as described.

4. In an ironing-machine, the combination, with tables 1 and 2, provided with guide-bars 4 and 8, of the support 7, having cross-heads 6 and 11, and the screws 16, connected with said cross-heads, substantially as described.

5. In an ironing-machine, the combination, with an ironing-table, of a goose-neck or arm mounted upon a rotating shaft, a coiled spring embracing said shaft and connected thereto at one end, the other end of said spring being connected with the goose-neck or arm, and means for rotating the shaft, substantially as described.

6. In an ironing-machine, the combination, with the ironing-table, of the shaft 20, carrying goose-neck or arm 19, having pin 26 intermediate its ends, the coiled spring 23 on said shaft having one end extended or formed into an arm 25, engaging with pin 26, the stud or pin 24 on the shaft engaging with the other end of the spring, the arm 27 on the shaft 20, and the pin 28, engaging with a perforation in one of the bearings 21 of the shaft, substantially as described.

7. In an ironing-machine, the combination, with the ironing-table, of the shaft 20, mounted in bearings 21, carrying goose-neck or arm 19, having pin 26 intermediate its ends, the coiled spring 23 on said shaft having one end extended or formed into an arm 25, engaging with pin 26, the stud or pin 24 on shaft 20, engaging with the other end of the spring, the crank-arm 27, the pin 28 thereon, engaging with perforations in one of the bearings 21, the lever 30, fulcrumed to the crank-arm and connected with pin 28, and the spring 32, substantially as described.

In testimony that I claim the foregoing as my own I have hereunto affixed my signature in presence of two witnesses.

JOHN J. DALEY.

Witnesses:
GEORGE J. DALEY,
JOSEPH H. DALEY.